No. 891,791.  
PATENTED JUNE 23, 1908.

R. J. BOGUE.  
STALK PULLER, SEEDER, AND PULVERIZER.  
APPLICATION FILED JAN. 6, 1908.

WITNESSES  
Chas. A. Clark.  
C. W. Fairbank.

INVENTOR  
Robert J. Bogue  
BY  
ATTORNEYS

UNITED STATES PATENT OFFICE.

ROBERT JACKSON BOGUE, OF PARIS, TEXAS.

STALK-PULLER, SEEDER, AND PULVERIZER.

No. 891,791.  Specification of Letters Patent.  Patented June 23, 1908.

Original application filed April 10, 1907, Serial No. 367,362. Divided and this application filed January 6, 1908. Serial No. 409,538.

*To all whom it may concern:*

Be it known that I, ROBERT JACKSON BOGUE, a citizen of the United States, and a resident of Paris, in the county of Lamar and State of Texas, have invented a new and Improved Stalk-Puller, Seeder, and Pulverizer, of which the following is a full, clear, and exact description.

This invention relates to certain improvements in agricultural implements, and more particularly to a hollow drum adapted for use in the pulling of corn stalks, cotton stalks, or the like, for pulverizing the ground, and for seeding and planting. The specific drum illustrated is adapted for use with various type of machines, but preferably in connection with the machine illustrated and claimed in my previous application, Serial No. 367,362, filed April 10, 1907, from which the present application has been divided.

Figure 1:
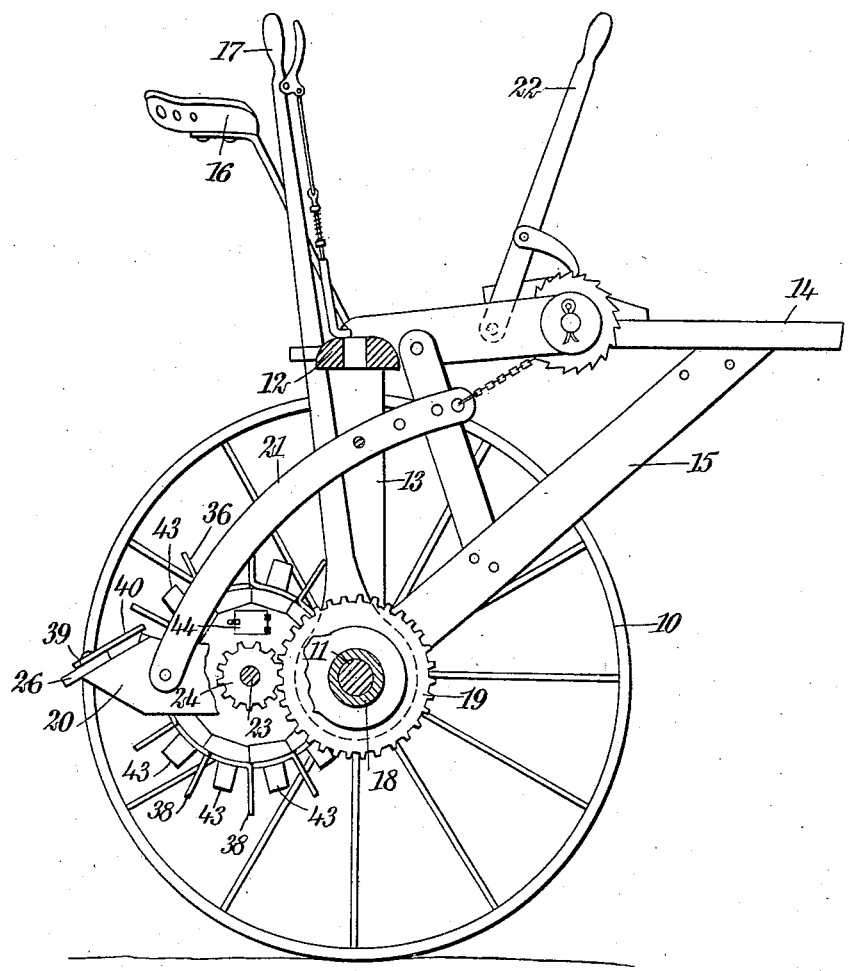
Figure 2:
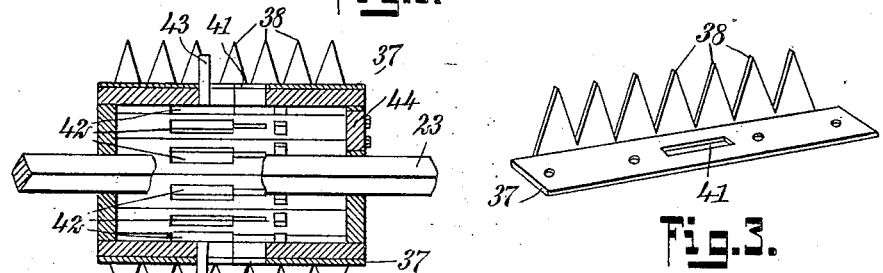
Figure 3:
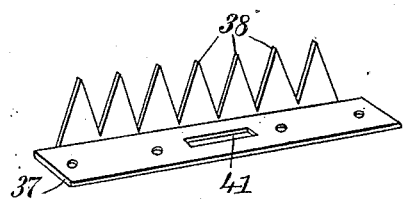

Reference is to be had to the accompanying drawings, forming a part of this specification, in which similar characters of reference indicate corresponding parts in all the figures, and in which Figure 1 is a longitudinal section through an implement substantially as shown in my application above referred to, and illustrating an end view of the drum; Fig. 2 is a longitudinal section through the drum; and Fig. 3 is a perspective view of one of the teeth-bearing plates carried by the drum.

For a detailed description of the implement, a portion of which is illustrated in Fig. 1, reference may be had to my co-pending application above referred to, but in brief the implement involves main wheels 10, mounted on an axle 11, which latter supports the main frame of the implement. The frame includes a transverse beam 12, uprights 13, a draft pole 14, and diagonal braces 15. The frame supports a seat 16, adjacent which is an operating handle 17, by means of which the drum may be thrown into or out of gear, so as to rotate it at will from the axle. The wheel is rigidly secured to a sleeve 18 rotating on the stationary axle, and to the sleeve is also secured a gear wheel 19. The implement carries oppositely-disposed pivoted arms 20, normally extending rearwardly from the axle, and pivoted to the ends of the arms are links 21, having suitable operating mechanism connecting them to a handle 22, whereby the free ends of the arms may be raised or lowered at will. Mounted in these arms is the axle 23 which supports my improved drum, and to this axle is also secured a gear wheel 24, intermeshing with the gear wheel 19, whereby the drum is rotated. The outer ends of the arms 20 are connected together by a board 26, hereinafter referred to as the "shedding board", which is provided with teeth engaging with those of the drum, and also serves to secure the simultaneous movement of the two arms.

My improved drum, which is rigidly secured to the shaft 23, is preferably hollow and is provided with a series of longitudinal plates 37 secured to the outer circumference thereof. Each of the plates is provided with a series of teeth 38 at one edge thereof and extending outward radially from the drum. The plates may be provided of any desired width but are preferably so constructed that they cover substantially the entire circumferential surface of the drum. The shedding board 26 is provided with a plate 39 rigidly secured thereto and having teeth 40 corresponding in size and position to those upon the drum, and adapted to mesh with said teeth as the drum is rotated.

As previously stated, the teeth 38 of the drum extend radially, but the teeth 40 of the plate 39 extend substantially tangentially to the body of the drum, whereby as the teeth of the drum pass between those of the shedding board all foreign matter interspersed between the first-mentioned teeth will be removed and will drop from the machine at the outer side of the shedding board. Each of the plates 37 of the drum is provided with a slot 41 extending longitudinally thereof and communicating with the interior chamber of the drum. For controlling each of the slots, I provide an interior longitudinally movable plate 42 adjacent each of the slots and having an arm or operating handle 43 extending outwardly therefrom. The outer end of each arm or operating handle is of substantially greater width than the slot, whereby it is prevented from passing inwardly therethrough, and is so constructed that it frictionally engages with the outer surface of the slot to prevent the free longitudinal movement of the plate. By means of the handle 43, each plate may be moved longitudinally to cover or uncover as much of the corresponding slot as may be desired.

The drum is adapted to contain the seeds when the device is employed as a planter or seeder, and one end of the drum is provided with any suitable filling opening and closure 44 therefor. When employing the device as a seeder, the drum is filled and lowered to such a position that the teeth enter the ground and displace a portion thereof. The teeth at the lower side of the drum move forward as the drum rotates, and while each tooth is forming a small furrow in the ground the seeds pass outward through the opening back of the lowermost row of teeth and fall into the furrows formed by the teeth. The next row of teeth serves to cover up the seeds already dropped and to form pockets or furrows for the seeds dropped through the next opening. By moving the plates 42, the size of the opening in the wall of the drum may be readily controlled and the quantity of seed dropped at each revolution of the drum thus controlled. In the drawings I have illustrated only a single circumferential row of openings and controlling plates 42 therefor, but it is evident that any desired number may be employed.

If desired, the seeds may be omitted from the drum and the drum lowered to a still further extent, so that the successive series of teeth intersect the ground and serve to pulverize the same, while the board 26 following the teeth serves to remove any unevenness caused by the teeth.

In employing the device as a stalk-puller, the drum is raised to the desired elevation, so that as the implement is drawn along the stalks enter the recesses between the teeth on the front side of the drum, and as the teeth at this point are continually moving upward, the stalks are caught in the sharp angles between the teeth and pulled out of the ground. After the stalks have traveled up with the front side of the drum and across the top thereof, they are removed from the drum by the teeth 40 on the shedding board.

Having thus described my invention, I claim as new and desire to secure by Letters Patent:

1. In a device of the class described, a hollow rotatable drum having a plurality of sheet metal plates secured thereto and extending longitudinally thereof, each of said plates having a row of pointed teeth extending along one side thereof and extending outwardly from said plate at substantially right angles.

2. In a device of the class described, a hollow drum having the outer surface formed of a series of sheet metal plates disposed longitudinally of said drum, and each plate having a longitudinal slot therein intermediate its edges and a plurality of teeth extending outwardly therefrom along one edge thereof, and means within said drum for closing said slots.

3. In a device of the class described, a hollow drum having a plurality of longitudinally-disposed rows of pointed teeth, a plurality of longitudinally-disposed slots intermediate said rows of teeth, a plurality of movable plates within said drum for closing said slots, and means carried by each plate and extending through its corresponding slot for moving said plates longitudinally of the drum.

4. In a device of the class described, a hollow drum having a plurality of longitudinally-disposed rows of pointed teeth disposed about the circumference thereof, a plurality of apertures intermediate said rows of teeth, means for closing said apertures, a filling opening in the end of said drum, and means for closing said opening.

In testimony whereof I have signed my name to this specification in the presence of two subscribing witnesses.

ROBERT JACKSON BOGUE.

Witnesses:
  G. W. MOORE,
  J. H. LOTER.